United States Patent
Gibson et al.

(10) Patent No.: US 8,727,067 B2
(45) Date of Patent: May 20, 2014

(54) METHOD FOR SUPPLYING POWER TO AN ELECTRICALLY ASSISTED STEERING SYSTEM

(75) Inventors: Alex O'Connor Gibson, Ann Arbor, MI (US); Allan Roy Gale, Livonia, MI (US); John Anthony DeMarco, Lake Orion, MI (US); Robert Michael Grant, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 13/174,567

(22) Filed: Jun. 30, 2011

(65) Prior Publication Data

US 2013/0001006 A1   Jan. 3, 2013

(51) Int. Cl.
*B62D 5/04* (2006.01)

(52) U.S. Cl.
CPC ................................... *B62D 5/0475* (2013.01)
USPC .......................................... 180/446; 180/443

(58) Field of Classification Search
USPC ............................. 180/443, 446; 701/41, 112
See application file for complete search history.

(56) References Cited

U.S. PATENT DOCUMENTS

RE39,023 E  *  3/2006  Sasaki .......................... 318/140
7,215,034 B2 *  5/2007  Hino et al. .................. 290/40 C
2009/0292454 A1    11/2009  Nakai
2010/0305838 A1    12/2010  Yamamura et al.
2012/0215429 A1*   8/2012  Yumisashi et al. ............ 701/112
2012/0330508 A1*  12/2012  Pebley et al. .................. 701/41

FOREIGN PATENT DOCUMENTS

| EP | 0282894 A2 | 9/1988 |
| EP | 2 028 743 A2 | 2/2009 |
| EP | 2 213 870 A2 | 8/2010 |
| FR | 2911566 A1 | 7/2008 |
| JP | 5338547 A | 12/1993 |
| JP | 2008273466 A | 11/2008 |

OTHER PUBLICATIONS

ISA European Patent Office, International Search Report of PCT/US2011/059167, Sep. 28, 2012, 4 pages.
ISA European Patent Office, Written Opinion of PCT/US2011/059167, Sep. 28, 2012, 4 pages.
Gibson, Alex O'Connor et al., "Method for Controling Vehicle Launch," U.S. Appl. No. 13/174,559, filed Jun. 30, 2011, 49 pages.

* cited by examiner

*Primary Examiner* — Anne Marie Boehler
*Assistant Examiner* — Maurice Williams
(74) *Attorney, Agent, or Firm* — Julia Voutyras; Alleman Hall McCoy Russell & Tuttle LLP

(57) ABSTRACT

A method for supplying power to an electrically assisted steering system is described. In one example, the method adjusts alternator field current to increase energy supplied to the electrically assisted steering system in response to an automatic engine stop request. The method may improve operation of the electrically assisted steering system.

19 Claims, 10 Drawing Sheets

METHOD FOR SUPPLYING POWER TO AN ELECTRICALLY ASSISTED STEERING SYSTEM

FIELD

The present description relates to a system and method for improving performance of an electrically assisted power steering system. The method may be particularly useful for a vehicle having an engine that is automatically started after being automatically stopped.

BACKGROUND AND SUMMARY

Electrically assisted power steering systems can provide advantages over mechanically driven hydraulic steering systems. For example, the amount of steering assistance provided to a driver of a vehicle can be varied between drivers. In other words, one driver may be provided more assistance than another driver of the same vehicle. Further, the steering assistance can be varied according to a wide array of driving conditions. In one illustration, one level of electrical steering assistance may be provided to a driver when the vehicle is traveling in a forward direction and a second level of electrical steering assistance may be provided when the vehicle is traveling in a reverse direction. Similarly, one level of electrical steering assistance may be provided at lower vehicle speeds while a second level of electrical steering assistance is provided at higher vehicle speeds. However, after a vehicle is stopped it may require time to power up the electrical power steering system. Consequently, steering the vehicle may be difficult immediately after an engine start.

The inventor herein has recognized the above-mentioned disadvantages and has developed a method for improving electrically assisted vehicle steering. One example of the present description provides for a vehicle launch control method, comprising: adjusting a load of an alternator applied to an engine in response to a steering input and an engine torque request.

Thus, vehicle launch may be improved by considering vehicle steering input and engine torque request. In particular, when a steering angle input or a steering torque is at a higher level, power supplied by the engine to an electric steering system can be increased so that the vehicle can start to turn more quickly. On the other hand, if an engine torque request is at a higher level, additional engine torque may be provided to vehicle wheels to improve vehicle acceleration. Further, when the engine torque demand and the steering angle are at medium levels, engine power may be supplied to vehicle wheels and the electric steering system in response to weighted engine torque request and steering input.

The present description may provide several advantages. Specifically, the approach may improve vehicle launch so that a driver experiences smoother engine torque during vehicle acceleration. In addition, the approach may improve alternator field control during automatic engine starts. Further, the approach may provide improved engine torque arbitration and engine speed control for vehicles with electric steering systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
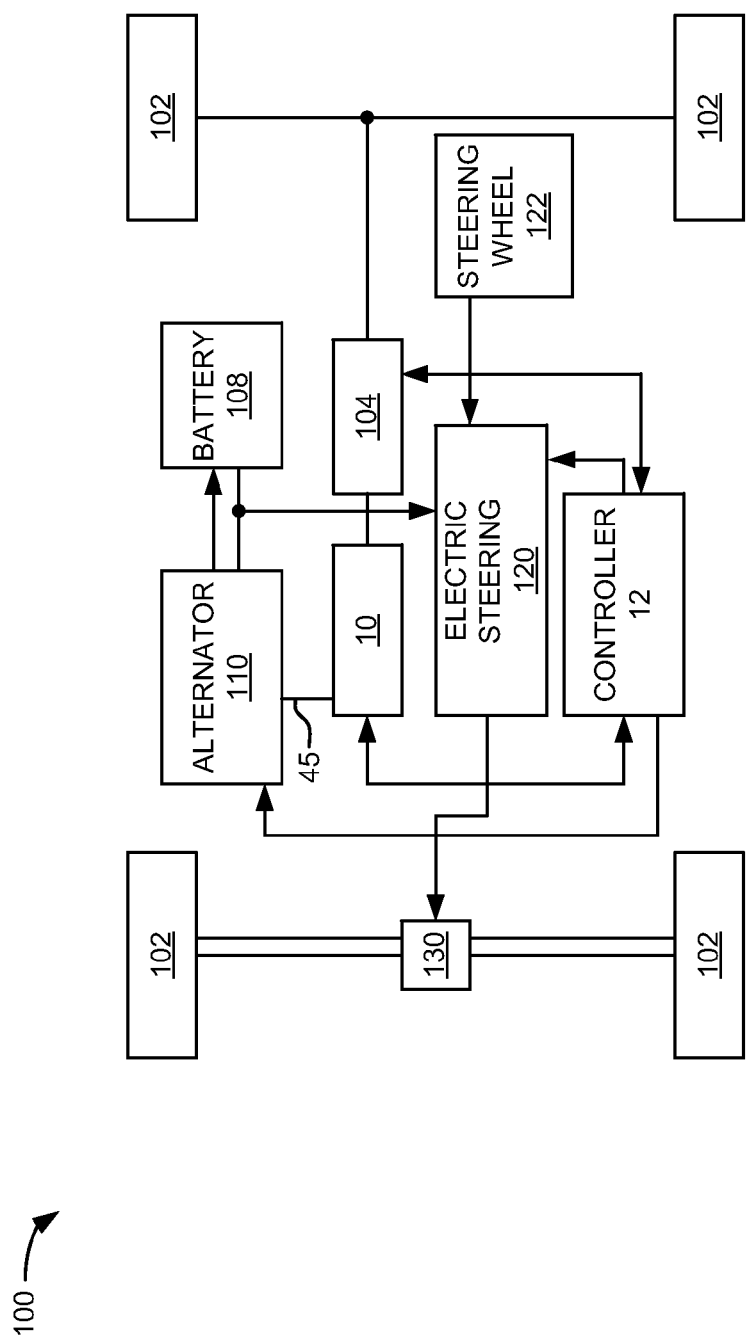
FIG. 1 is a schematic diagram of a vehicle.
Figure 2:
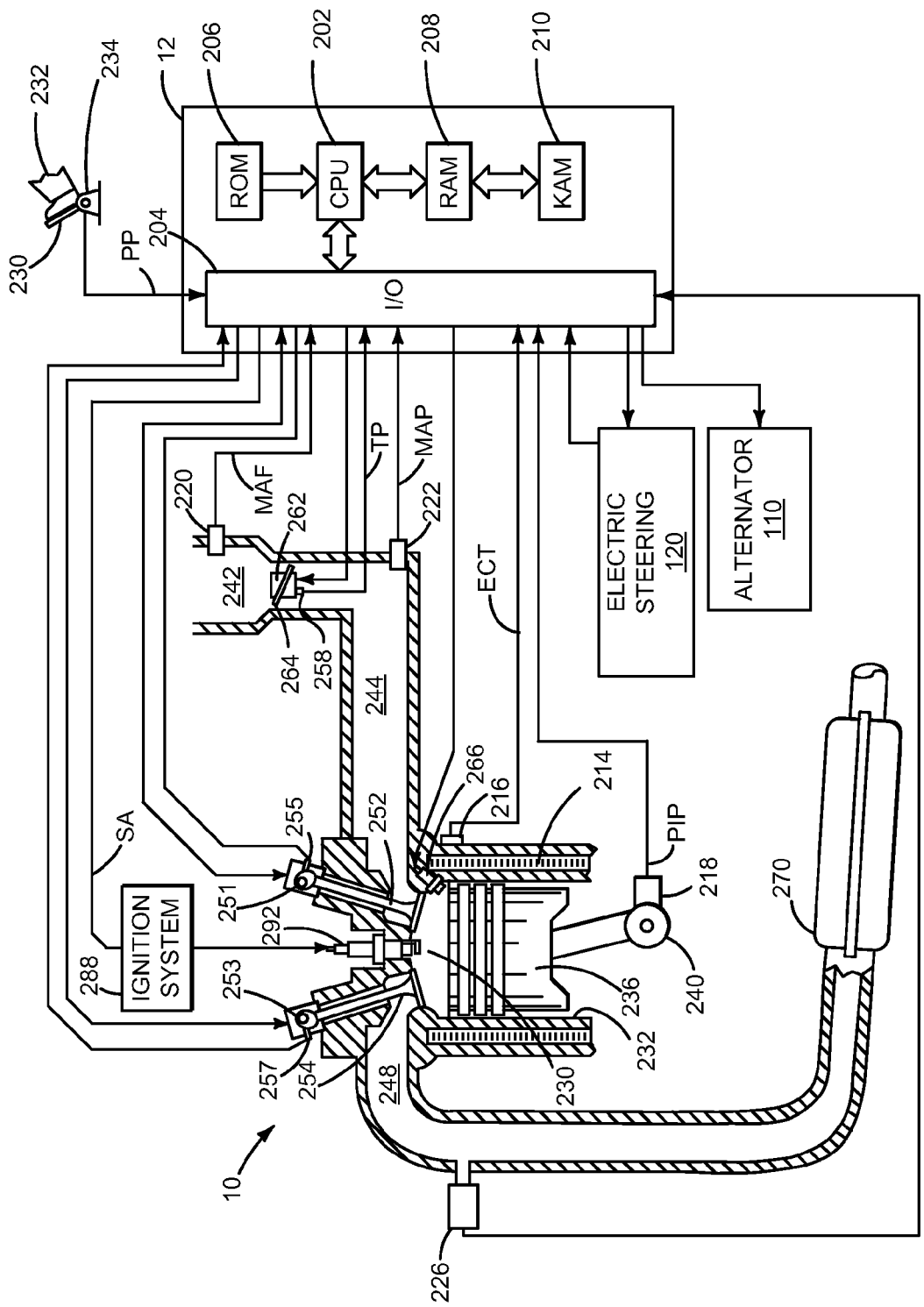
FIG. 2 is a schematic diagram of an engine.

The present description is related to launching a vehicle. In one non-limiting example, the vehicle may be configured as illustrated in FIG. 1. Further, an engine as shown in FIG. 2 may be part of the vehicle. The engine and alternator of the vehicle may be controlled as shown in FIGS. 3A-6 according to the methods of FIGS. 7-8 and 10.

Referring now to FIG. 1, vehicle 100 includes wheels 102. Torque is supplied to wheels 102 via engine 10 and transmission 104. In some examples, an electric motor or hydraulic motor may also provide torque to wheels 102. Vehicle 100 also includes an electric steering system 120. In some examples, electric steering system can turn wheels 102 directly in response to input from steering wheel 122 or other steering input. In other examples, electric steering system 120 may provide electrical assistance to input from steering wheel 122. Steering motor 130 can adjust an angle of wheels 102 and is controlled via electric steering system 120. Battery 108 and alternator 110 may provide electrical power to electric steering system 120. Alternator 110 may be mechanically coupled to engine 10 via shaft or pulley 45. Controller 12 includes instructions for controlling and receiving inputs from alternator 110, electric steering system 120, engine 10, and transmission 104.

Referring to FIG. 2, internal combustion engine 10, comprising a plurality of cylinders, one cylinder of which is shown in FIG. 2, is controlled by electronic engine controller 12. Engine 10 includes combustion chamber 230 and cylinder walls 232 with piston 236 positioned therein and connected to crankshaft 240. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. Alternatively, one or more of the intake and exhaust valves may be operated by an electromechanically controlled valve coil and armature assembly. The position of intake cam 251 may be determined by intake cam sensor 255. The position of exhaust cam 253 may be determined by exhaust cam sensor 257.

Fuel injector 266 is shown positioned to inject fuel directly into cylinder 230, which is known to those skilled in the art as direct injection. Alternatively, fuel may be injected to an intake port, which is known to those skilled in the art as port injection. Fuel injector 266 delivers liquid fuel in proportion to the pulse width of a signal from controller 12. Fuel is delivered to fuel injector 266 by a fuel system (not shown) including a fuel tank, fuel pump, and fuel rail (not shown). In addition, intake manifold 244 is shown communicating with optional electronic throttle 262 which adjusts a position of throttle plate 264 to control air flow from air intake 242 to intake manifold 244. In one example, a low pressure direct injection system may be used, where fuel pressure can be raised to approximately 20-30 bar. Alternatively, a high pressure, dual stage, fuel system may be used to generate higher fuel pressures.

Distributorless ignition system 288 provides an ignition spark to combustion chamber 230 via spark plug 292 in response to controller 12. Universal Exhaust Gas Oxygen (UEGO) sensor 226 is shown coupled to exhaust manifold 248 upstream of catalytic converter 270. Alternatively, a two-state exhaust gas oxygen sensor may be substituted for UEGO sensor 226.

Converter 270 can include multiple catalyst bricks, in one example. In another example, multiple emission control devices, each with multiple bricks, can be used. Converter 270 can be a three-way type catalyst in one example.

Controller 12 is shown in FIG. 2 as a conventional microcomputer including: microprocessor unit 202, input/output ports 204, read-only memory 206, random access memory 208, keep alive memory 210, and a conventional data bus. Controller 12 is shown receiving various signals from sensors coupled to engine 10, in addition to those signals previously discussed, including: engine coolant temperature (ECT) from temperature sensor 216 coupled to cooling sleeve 214; a position sensor 234 coupled to an accelerator pedal 230 for sensing force applied by foot 232; a measurement of engine manifold pressure (MAP) from pressure sensor 222 coupled to intake manifold 244; an engine position sensor from a Hall effect sensor 218 sensing crankshaft 240 position; a measurement of air mass entering the engine from sensor 220; and a measurement of throttle position from sensor 258. Barometric pressure may also be sensed (sensor not shown) for processing by controller 12. In a preferred aspect of the present description, engine position sensor 218 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion. During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

In this way, the system of FIGS. 1 and 2 provides for a system for controlling vehicle launch, comprising: an alternator; a starter; an engine; and a controller, the controller including instructions to automatically start the engine in absence of a dedicated operator engine start request, the controller including additional instructions to adjust an alternator load applied to the engine in response to an engine torque request and a steering request, the controller including additional instructions to adjust alternator load applied to the engine in response to vehicle wheel slip. The system includes where the alternator load applied to the engine in response to vehicle wheel slip is increased. The system further comprises additional controller instructions to adjust alternator load supplied to the engine in response to an engine torque reserve. In one example, the system further comprises additional controller instructions for adjusting the alternator load applied to the engine in response to a predicted combustion event of the engine. The system further comprises an electric steering system. Thus, engine mechanical torque can be converted to electrical energy to improve vehicle steering during an engine start. The system also includes where the electric steering system is electrically coupled to a battery and the alternator.

The system of FIGS. 1 and 2 also provides for a system for controlling energy of an electrically assisted steering system, comprising: an electrically assisted steering system; a battery; an engine; and a controller, the controller including instructions to increase an amount of energy stored in the electrically assisted steering system in response to an automatic engine stop in the engine in absence of a dedicated operator engine stop request, the controller including additional instructions to supply energy from the battery to the electrically assisted steering system when the engine is stopped. The system includes where the energy stored in the electrically assisted steering system is increased via adjusting field current of an alternator. The system further comprises additional controller instructions to limit current flow from the battery to the electrically assisted steering system in response to a charge level of the battery. The system further comprises additional controller instructions to increase energy stored in the electrically assisted steering system via adjusting a field current supplied to an alternator. The system further comprises additional controller instructions to limit the field current supplied to the alternator in response to engine speed.

Figure 3A:
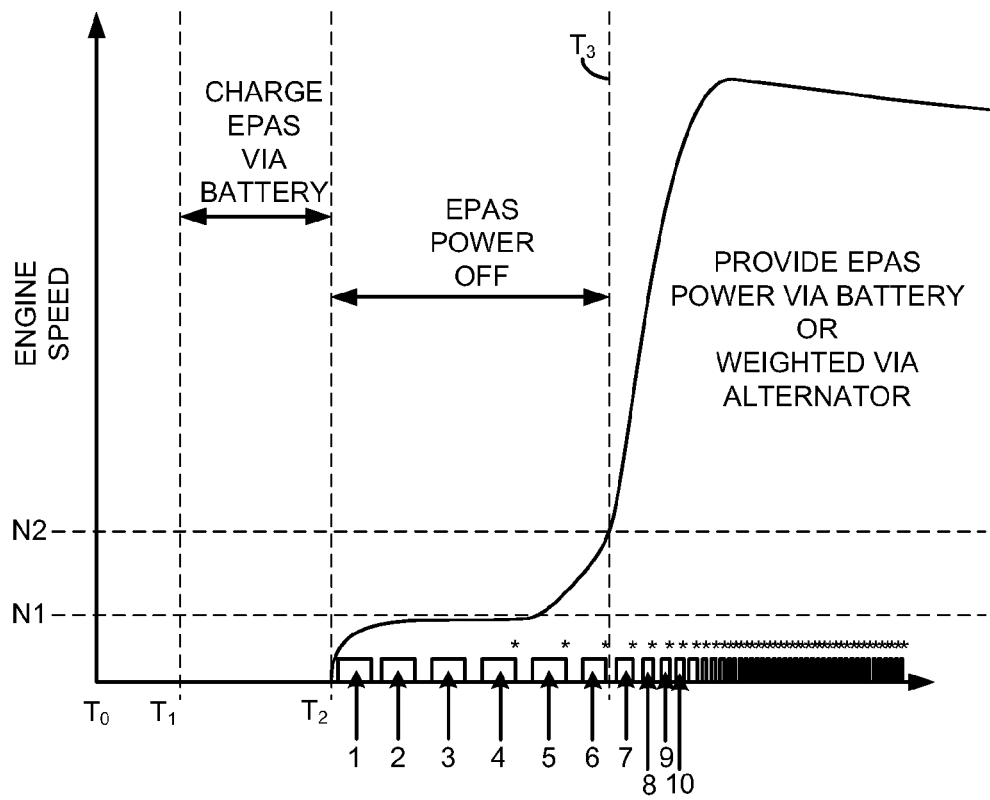
FIG. 3A is an example plot of an engine start.

Referring now to FIG. 3A, an example plot of simulated signals during an operator requested engine start are shown.

Figure 7:
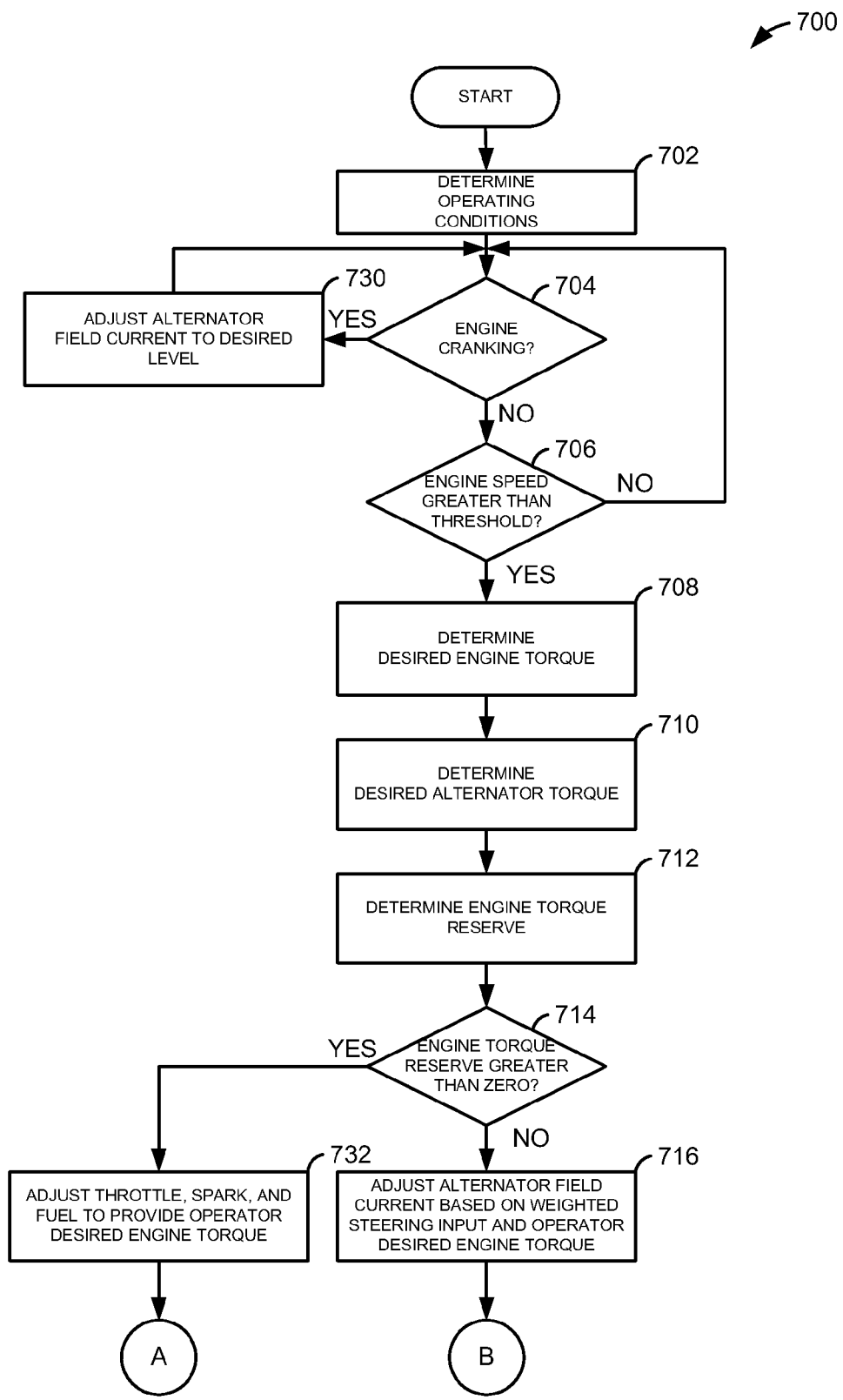
FIG. 7 is a flowchart of a vehicle launch method.
Figure 8:
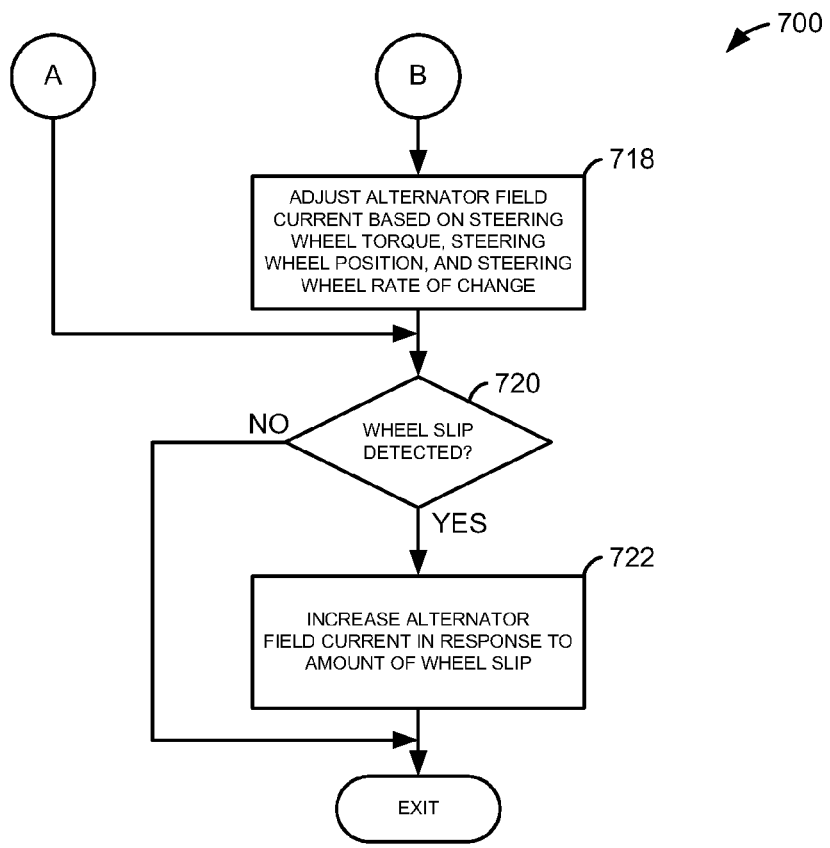
FIG. 8 is a continuation of the flowchart of FIG. 7.

The signals of FIG. 3A may be provided by the method of FIGS. 7-8 in a system as described in FIGS. 1-2.

The Y axis of the plot represents engine speed and the X axis represents time. Engine speed increases in the direction of the Y axis arrow. Time increases in the direction of the X axis arrow. Times of interest are indicated via vertical markers $T_0$-$T_3$. Engine speeds of interest are indicated via horizontal markers N1 and N2.

At time $T_0$, the engine is stopped and there is no operator start request. During engine stop without an operator start request, current less than an amount to turn vehicle wheels flows to the electric power assist steering (EPAS) system. In this way, battery power can be conserved while the engine is not running.

At time $T_1$, a signal indicating an engine start may be imminent is received by an engine controller. The signal may be a key-on signal, a push button signal, or a signal from another system such as a hybrid controller. The signal causes battery power to flow to the EPAS system. In one example, the EPAS system includes capacitors for storing energy to assist an operator requesting a change in vehicle wheel angle so as to change the direction of a vehicle. Energy stored in the capacitors may be used to assist the driver to change wheel angle when battery power to the EPAS system is interrupted or limited.

At time $T_2$, the engine controller receives a request to crank the engine and engine cranking begins. During engine cranking a starter is engaged and the engine is rotated. The starter uses a higher level of battery current than other vehicle systems. Therefore, current flow to the EPAS system is limited during engine cranking. In one example, current flow to the EPAS system is interrupted during engine cranking. The time between time $T_1$ and time $T_2$ may vary depending on operator inputs and system inputs. Therefore, during some examples, capacitors in the EPAS system may fully charge while during other examples the capacitors in the EPAS system may not fully charge before engine cranking begins.

Between time $T_2$ and time $T_3$, the engine rotates and is supplied fuel and air. Cylinder intake and compression strokes during cranking are indicated and numbered 1-10. Spark events are indicated by * and begin after engine position is known and after engine cylinders begin to receive fuel. In this example, the first spark event occurs after a fourth cylinder intakes air and compresses the air. The spark ignites an air-fuel mixture and the engine begins to accelerate. In some examples, the timing of a first combustion event can be predicted based on cylinders receiving fuel and engine position. Further, timing of when electrical power is delivered to the EPAS system may be responsive to a predicted cylinder event, such as a first or subsequent counted combustion event. For example, power may be delivered to the EPAS system in response to a first combustion event since engine stop. In other examples, power may be delivered to the EPAS system in response to engine speed exceeding a threshold level. For example, power may be supplied to the EPAS system when engine speed exceeds N1. In another example, engine cranking speeds may be characterized as below the N1 threshold and power may be supplied to the EPAS system when engine speed exceeds the N2 threshold. Thus, the engine may be allowed to accelerate to a desired speed before power is supplied to the EPAS system.

At time $T_3$, power is supplied to the EPAS system in response to a counted number of combustion events since engine stop. Alternatively, power can be supplied at time $T_3$ in response to engine speed exceeding engine speed threshold N2. Power can be supplied to the EPAS system via solely the vehicle battery, solely the vehicle alternator, or via the alternator and the battery. Further, as described in greater detail with respect to FIGS. 7 and 8, an amount of electrical power supplied to the EPAS system may be responsive to a steering system input (e.g., steering angle or steering wheel torque) and an engine torque request (e.g., via an accelerator pedal or a controller signal).

Figure 3B:
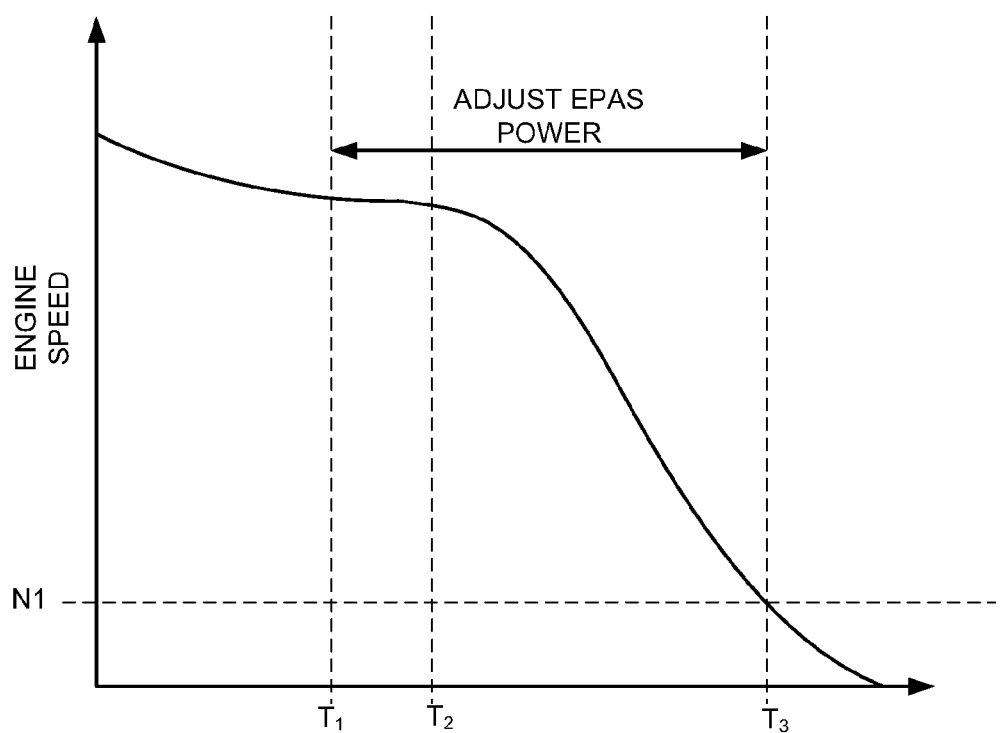
FIG. 3B is an example plot of an engine stop.

Referring now to FIG. 3B, an example plot of simulated signals of interest during an engine stop is shown. The signals of FIG. 3B may be provided by the method of FIG. 10 in a system as described in FIGS. 1-2.

The Y axis represents engine speed and engine speed increases in the direction of the Y axis arrow. The X axis represents time and time increases in the direction of the X axis arrow.

Before time $T_1$, the engine is running and power may be supplied to the EPAS system or power may be limited to the EPAS system depending on driver input. In some examples, capacitors store charge to power the EPAS system so that the battery or alternator does not have to constantly supply power to the EPAS system so that energy may be conserved.

At time $T_1$, a request to automatically stop the engine is made. The request to stop the engine may be within an engine controller or initiated via a driver input signal such as a key-off signal. The request to automatically stop the engine also may initiate charging capacitors in the EPAS system in response to a level of charge stored by EPAS capacitors. If the EPAS capacitor charge level is less than a threshold, charging of the EPAS capacitors can be initiated by increasing the output of the vehicle alternator by increasing the alternator field strength, for example.

At time $T_2$, the engine stop process is initiated. Engine stop may be initiated via stopping or reducing fuel flow to the engine, for example. The EPAS system continues to receive current from the alternator during the time the engine speed is decreasing. In this way, additional power may be supplied to the EPAS system so that less power may be supplied to the EPAS system during an automatic engine restart.

At time $T_3$, engine speed has decayed to less than threshold level N1. Therefore, the current to the alternator field is reduced so as to reduce battery power consumption. Since the alternator may provide little additional charge to the EPAS system when engine speed is less than threshold engine speed N1, current supplied from the battery to the alternator field coil can be reduced without impacting EPAS charging. Method 1000 of FIG. 10 may provide for the sequence of FIG. 3B.

Figure 4:
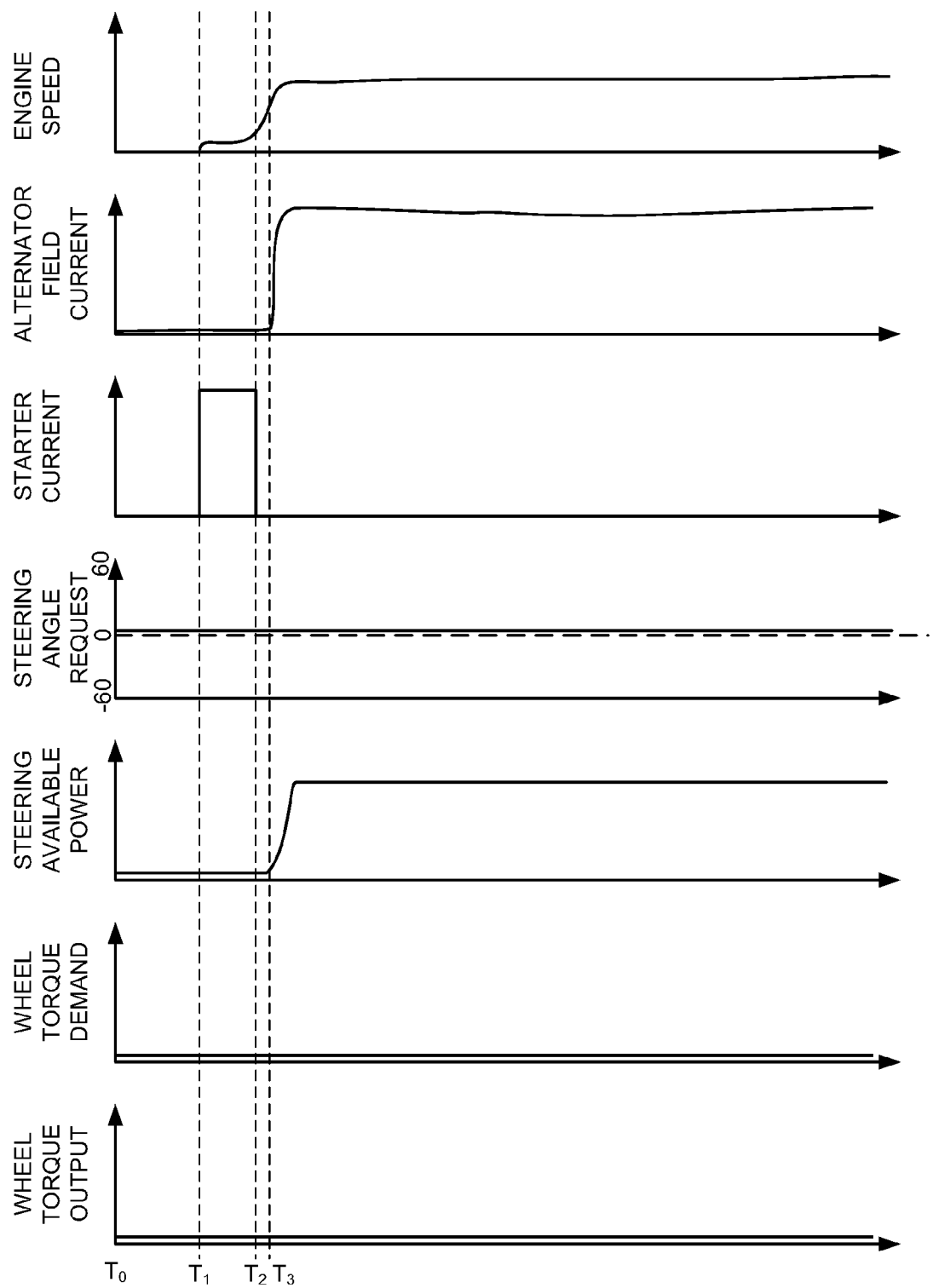
FIG. 4 is an example plot of signals of interest during a simulated engine start.

Referring now to FIG. 4, an example plot of signals of interest during a simulated engine start is shown. The signals of FIG. 4 may be provided by the method of FIGS. 7-8 in a system as described in FIGS. 1-2. In one example, the engine restart of FIG. 4 takes place after the engine has been automatically stopped.

The first plot from the top of FIG. 4 represents engine speed versus time. The Y axis represents engine speed and engine speed increases in the direction of the Y axis arrow. The X axis represents time and time increases from left to right side of the figure.

The second plot from the top of FIG. 4 represents alternator field current versus time. The Y axis represents alternator field current and alternator field current increases in the direction of the Y axis arrow. The X axis represents time and time increases from left to right side of the figure. Alternator output can increase with increased alternator field current.

The third plot from the top of FIG. 4 represents engine starter current versus time. The Y axis represents engine starter current and engine starter current increases in the direction of the Y axis arrow. The X axis represents time and time increases from left to right side of the figure.

The fourth plot from the top of FIG. 4 represents steering angle request versus time. The Y axis represents steering angle request. In this example, the requested steering angle can vary between −60 and +60 degrees. A request of zero degrees represents wheels oriented to direct the vehicle in a straight line. A request of 60 represents a right turn request. A request of −60 represents a left turn request. The X axis represents time and time increases from left to right side of the figure.

The fifth plot from the top of FIG. 4 represents steering system available electric power versus time. The Y axis represents steering system available electric power and steering system available electric power increases in the direction of the Y axis arrow. The X axis represents time and time increases from left to right side of the figure. When steering system available power is at an increased level, vehicle wheels may be turned at a faster rate.

The sixth plot from the top of FIG. 4 represents engine torque demand versus time. The Y axis represents engine torque demand and engine torque demand increases in the direction of the Y axis arrow. In one example, the engine torque demand is determined from a position of an accelerator pedal that may be depressed by an operator. In other examples, the engine torque command may be via a controller such as a hybrid powertrain controller. The X axis represents time and time increases from left to right side of the figure.

The seventh plot from the top of FIG. 4 represents net engine output torque available to the transmission to drive vehicle wheels. The Y axis represents net engine output torque available to the transmission to drive vehicle wheels and net engine output torque available to the transmission to drive vehicle wheels increases in the direction of the Y axis arrow. The X axis represents time and time increases from left to right side of the figure.

At time $T_0$, the engine is stopped and alternator field current is reduced to substantially zero since the alternator cannot output power when the engine is not rotating. The steering angle input is also substantially zero indicating that there is no operator steering input. The steering system available electric power is also low during the engine stop period. However, during other examples, the steering system available electric power may be at a higher level during the engine stop period since some power may be stored in capacitors of the EPAS system. The engine torque demand and net engine output torque available to the transmission to drive vehicle wheels is also low since the engine is stopped.

At time $T_1$, the starter is engaged and the engine is cranked. During the engine crank period the alternator field current is limited so that the alternator does not reduce the power available to the engine starter. The steering angle request remains at a low level during engine cranking as do steering system available electric power, engine torque demand, and net engine output torque available to the transmission to drive vehicle wheels.

At time $T_2$, the engine starter is disengaged. The engine starter may be disengaged in response to engine speed exceeding a threshold speed. Alternator field current, steering angle request, steering system available electric power, engine torque demand, and net engine output torque available to the transmission to drive vehicle wheels also remain low at time $T_2$.

At time $T_3$, alternator field current is increased. The time at which alternator field current may be increased in response to a number of combustion events since engine stop, engine speed exceeding a threshold speed, a number of engine events since engine stop (e.g., intake strokes), or a predicted combustion event since engine stop (e.g., first, second, third). As the alternator field current is increased, the output of the alternator increases. Consequently, additional power is available to the steering system. In some examples, battery power may be supplied to the EPAS as soon as engine cranking stops rather than after supplying current to the alternator field. The electrical power available to the steering system leads the alternator field current slightly. The engine torque demand and the net engine output torque available to the transmission to drive vehicle wheels remain low throughout the sequence.

In this way, when engine demand torque is low, the amount of electrical power available to the steering system can be increased so that a relatively high level of electrical power is available to the steering system as the engine is automatically started. Since the engine torque request is small, an increased amount of engine torque is available to produce electric power and supply the steering system.

Figure 5:
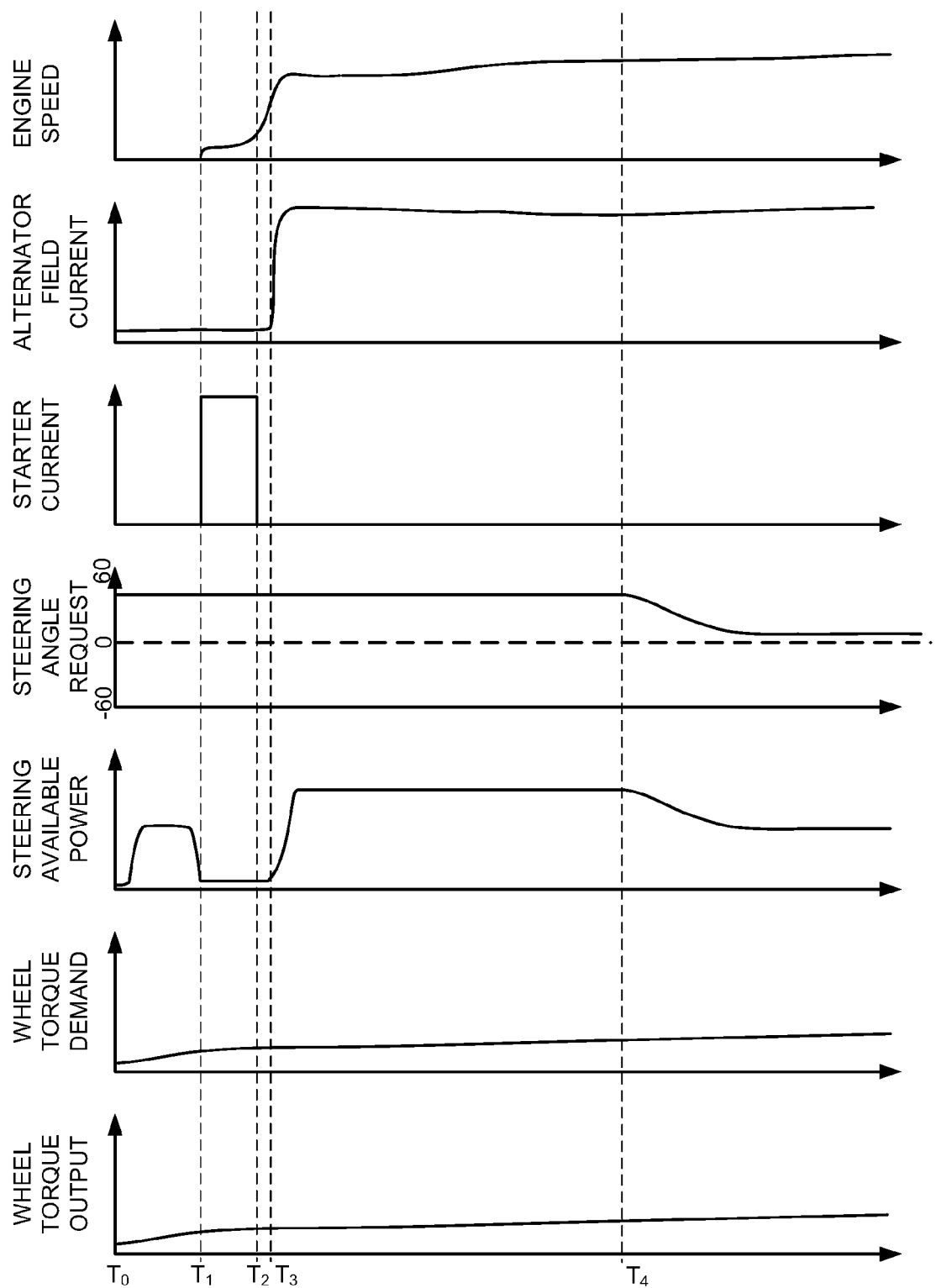
FIG. 5 is another example plot of signals of interest during a simulated engine start.

Referring now to FIG. 5, another example plot of signals of interest during a simulated engine start is shown. The signals of FIG. 5 are similar to the signals of FIG. 4. Therefore, for the sake of brevity, the description of each signal is not repeated. The signals of FIG. 5 may be provided by the method of FIGS. 7-8 in a system as described in FIGS. 1-2. In one example, the engine restart of FIG. 5 takes place after the engine has been automatically stopped as described in FIG. 3B.

At time $T_0$, the engine is stopped and alternator field current is reduced to substantially zero since the alternator cannot output power when the engine is not rotating. The steering angle input is at a relatively high angle and turned to the right indicating driver steering input. The steering system available electric power is at a medium level indicating that the battery is allowed to charge capacitors of the EPAS system so that vehicle wheels can turn. In some examples, the vehicle wheels may begin to turn when the EPAS system has received a threshold amount of charge from the battery. If the starter is engaged before the EPAS receives a threshold amount of charge from the battery, the vehicle wheels may be held in position until the engine is started. The engine torque demand and net engine output torque available to the transmission to drive vehicle wheels is also low during engine cranking.

At time $T_1$, the engine starter is engaged and the engine is cranked. During the engine crank period the alternator field current is limited so that the alternator does not cause additional current to be consumed by the engine starter. The steering angle request remains at a higher level during engine cranking. The steering system available power is at a low level since battery power is directed to the engine starter. The engine torque demand and net engine output torque available to the transmission to drive vehicle wheels are also low during engine cranking since little engine torque is available to vehicle wheels.

At time $T_2$, the engine starter is disengaged. The engine starter may be disengaged in response to engine speed exceeding a threshold speed. Alternator field current, steering system available electric power, engine torque demand, and net engine output torque available to the transmission to drive vehicle wheels also remain low at time $T_2$. The steering angle request remains high since the operator continues to request that the wheels turn.

At time $T_3$, alternator field current is increased. The time at which alternator field current may be increased in response to a number of combustion events since engine stop, engine speed exceeding a threshold speed, a number of engine events since engine stop (e.g., intake strokes), or a predicted combustion event since engine stop (e.g., first, second, third). The alternator field may be increased initially via battery current and then by alternator output as the alternator begins to operate. As the alternator field current is increased, the output of the alternator increases. Consequently, additional power is available to the steering system. Since the steering angle request is high, the alternator field current is adjusted to a higher level and additional load is applied to the engine via the alternator. By increasing the load that the alternator applies to the engine, less engine torque is available to propel the vehicle. In some examples, the load that the alternator applies to the engine is a weighted function of the steering angle request. For example, if the steering angle is less than 25% of the amount of steering input that can be requested, the alternator load applied to the engine can be adjusted to less than 5% of the engine's torque capacity at the present operating conditions (e.g., engine speed and load). On the other hand, if steering angle input is more than 50% of steering input that can be requested, the alternator load applied to the engine can be adjusted to more than 25% of the engine's torque capacity at the present operating conditions. In the present example, the steering system available power is increased to near 100% of the available power at the higher steering angle input.

In this way, when engine demand torque is a low to medium level, and the steering angle or torque request is at a relatively high level, the amount of electrical power available to the steering system can be increased so that a relatively high level of electrical power is available to the steering system and the amount of engine torque for engine acceleration is reduced. At time $T_4$, the steering available power is reduced as the steering angle request is reduced. Further, the steering available power may be reduced as vehicle speed increases so as to reduce the possibility of introducing a high steering angle at higher vehicle speeds.

Figure 6:
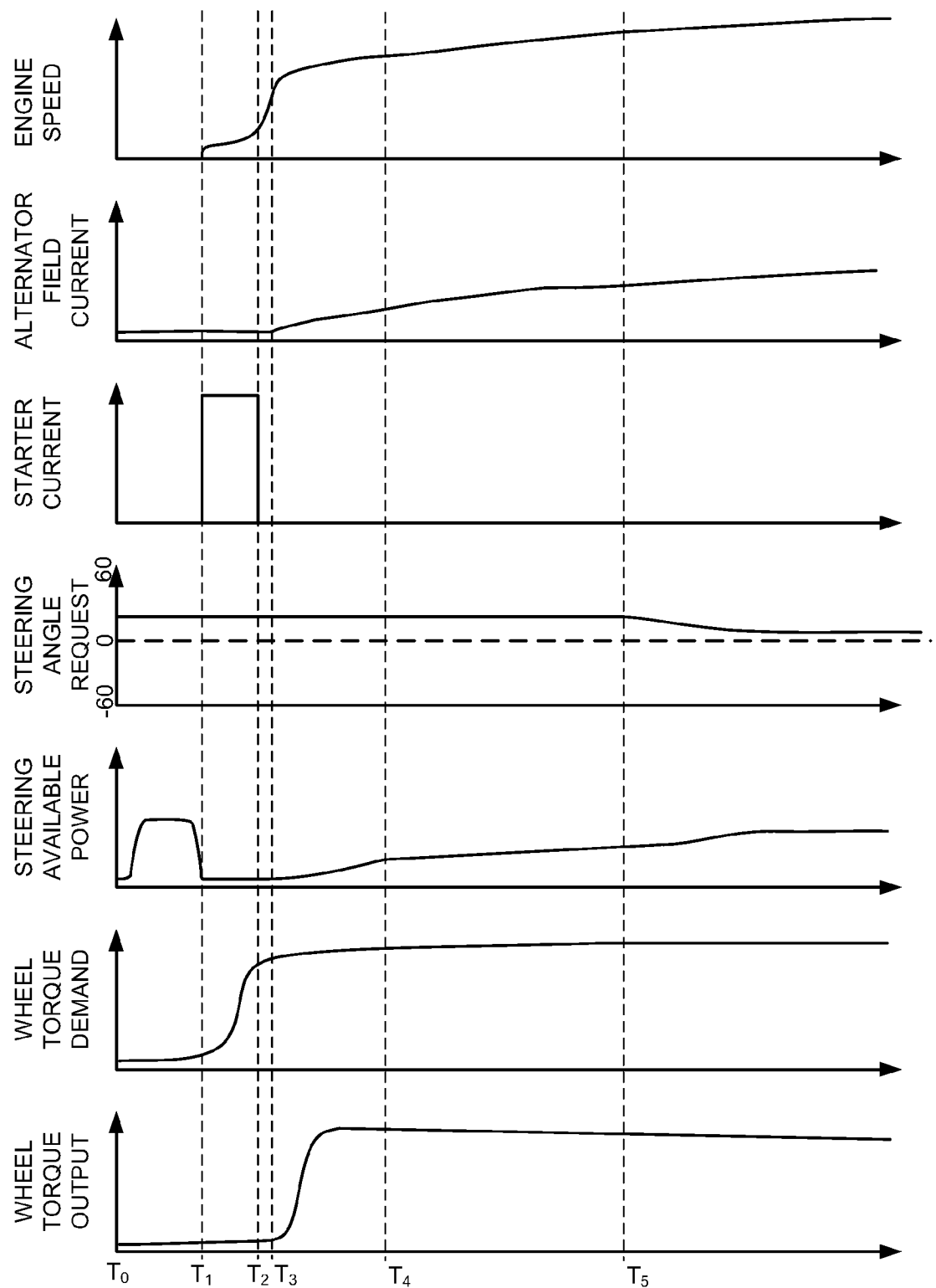
FIG. 6 is another example plot of signals of interest during a simulated engine start.

Referring now to FIG. 6, another example plot of signals of interest during a simulated engine start is shown. The signals of FIG. 6 are similar to the signals of FIG. 4. Therefore, for the sake of brevity, the description of each signal is not repeated. The signals of FIG. 6 may be provided by the method of FIGS. 7-8 in a system as described in FIGS. 1-2. In one example, the engine restart of FIG. 6 takes place after the engine has been automatically stopped as described in FIG. 3B.

At time $T_0$, the engine is stopped and alternator field current is reduced to substantially zero since the alternator cannot output power when the engine is not rotating. The steering angle input is at a medium angle and turned to the right indicating driver steering input. The steering system available electric power is at a medium level indicating that the battery is allowed to charge capacitors of the EPAS system so that vehicle wheels can turn. The engine torque demand and net engine output torque available to the transmission to drive vehicle wheels is also low since the engine is stopped.

At time $T_1$, the engine starter is engaged and the engine is cranked. During the engine crank period the alternator field current is limited so that the alternator does not cause additional current to be consumed by the engine starter. The steering angle request remains at a medium level during engine cranking. The steering system available power is at a low level since battery power is directed to the engine starter. The engine torque demand and net engine output torque available to the transmission to drive vehicle wheels are also low during engine cranking since little engine torque is available to vehicle wheels.

At time $T_2$, the engine starter is disengaged. The engine starter may be disengaged in response to engine speed exceeding a threshold speed. Alternator field current, steering system available electric power, and net engine output torque available to the transmission to drive vehicle wheels also remain low at time $T_2$. The engine torque request increases before time $T_2$ is reached indicating that the driver has depressed the accelerator before the engine is started.

At time $T_3$, alternator field current is gradually increased. The time at which alternator field current may be increased in response to a number of combustion events since engine stop, engine speed exceeding a threshold speed, a number of engine events since engine stop (e.g., intake strokes), or a predicted combustion event since engine stop (e.g., first, second, third). The alternator field may be increased initially via battery current and then by alternator output as the alternator begins to operate. As the alternator field current is increased, the output of the alternator increases. Since the engine torque request is high, the alternator field current is adjusted to a lower level so that the vehicle may be accelerated at a higher rate. By decreasing the load that the alternator applies to the engine, more engine torque is available to propel the vehicle. In this example, the load that the alternator applies to the engine is a weighted function of the steering angle request and the engine torque request. For example, since the engine torque request is greater than 50% of the amount of available engine torque, the alternator load applied to the engine can be decreased even thought the steering input is at a lower to medium level. In the present example, the engine torque available to the vehicle wheels is increased to near 100% of the available engine torque. Between times $T_3$ and $T_4$, the steering system available power is gradually increased at a first rate. Between times $T_4$ and $T_5$, the steering system available power is gradually increased at a second rate. Further, the engine output torque available to engine wheels is decreased as vehicle speed increases so that additional power may be supplied to the EPAS system.

Figure 9:
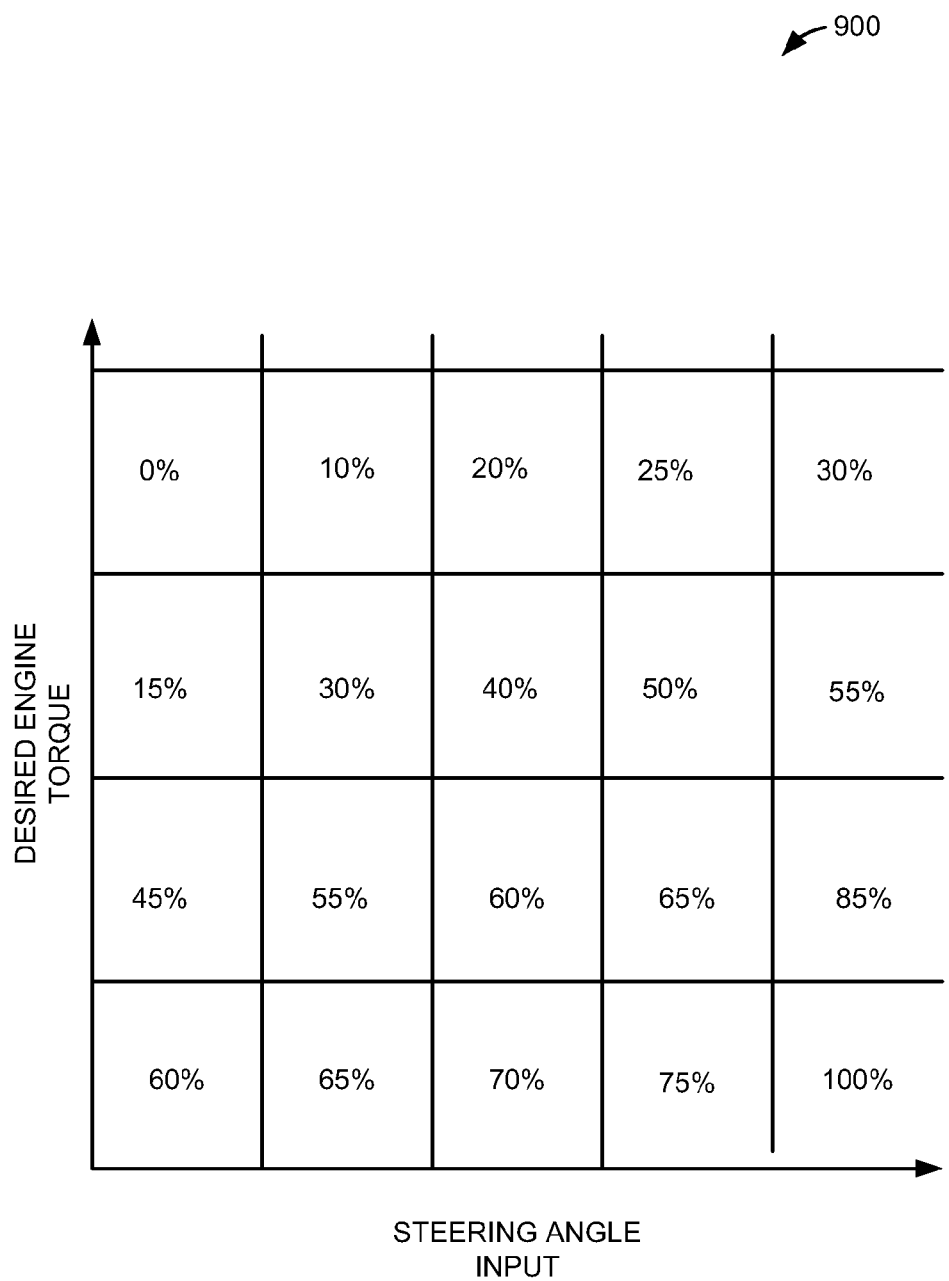
FIG. 9 is an example weighting function for alternator load applied to an engine.

Thus, FIGS. 4-6 show that alternator field current can be controlled to apply different levels of torque to the engine so that additional engine torque is available to vehicle wheels or so that steering system available electrical power can be increased. Further, the amount of torque applied by the alternator to the engine can be weighted depending on steering and engine torque demand. For example, if engine torque is requested at a higher level, priority may be given to provide wheel torque as compared to steering system electrical power. On the other hand, if steering angle input or steering torque is at a higher level and wheel torque demand is low, the alternator torque applied to the engine can be increased to increase steering system available power. FIG. 9 provides one example of weighting driver demand engine torque and steering input.

Referring now to FIGS. 7 and 8, a flow chart of a vehicle launch method is shown. The method of FIGS. 7 and 8 may be performed via instructions of controller 12 of FIGS. 1 and 2. In one example, the method of FIGS. 7 and 8 may be performed during an automatic engine start. For example, the method of FIGS. 7 and 8 may be performed in the absence of a dedicated operator engine start request (e.g., where the operator asserts an actuator that has a sole function of starting an engine).

At 702, method 700 determines operating conditions. In one example, operating conditions may include but are not limited to engine speed, engine torque or load, cylinder combustion events since engine stop, cylinder events since engine stop, steering angle or torque, wheel or engine torque demand, starter current, and alternator field current. Method 700 proceeds to 704 after operating conditions are determined.

At 704, method 700 judges whether or not the engine is being cranked via a starter or an electric motor. In one example, the engine is judged to be cranked when engine speed is greater than zero and less than a threshold engine speed while an engine starter is engaged. If method 700 judges that the engine is being cranked, method 700 proceeds to 730. Otherwise, method 700 proceeds to 706.

At 730, alternator field current is adjusted to a desired level. In one example, alternator field current is adjusted to substantially zero current. By adjusting alternator field current to zero, the engine starter does not have to overcome torque applied to the engine via the alternator. In other examples, a small amount of alternator field current may be applied to the alternator so that the alternator may output power sooner after engine crank. Method 700 returns to 704 after the alternator field current is adjusted to a desired level.

At 706, method 700 judges whether or not engine speed is greater than a threshold engine speed. In one example, the threshold engine speed may be an idle speed. Further, the threshold engine speed may vary with engine operating conditions. For example, at colder engine temperatures, the threshold engine speed may be greater than the threshold engine speed at higher engine temperatures. If engine speed is greater than a threshold speed, method 700 proceeds to 708. Otherwise, method 700 returns to 704.

At 708, method 700 determines desired engine torque or desired wheel torque from an operator input. In one example, desired engine torque or desired wheel torque may be determined from an accelerator pedal. A position of the accelerator pedal can be converted to an engine torque demand via a transfer function that converts a voltage from the accelerator to an engine torque command. In other examples, a position of the accelerator may be indicative of a desired vehicle wheel torque. The desired vehicle wheel torque can be converted to a desired engine torque by taking transmission gear ratios and losses into account. In other examples, desired engine torque may be determined from a controller input, such as a hybrid controller input to an engine controller. Method 700 proceeds to 710 after desired engine torque is determined.

At 710, method 700 determines a desired alternator torque that is to be applied to the engine. The alternator torque may be a function of the mode of engine operation (e.g., automatic starting, cold engine idle, combustion stability improvement) and electrical system voltage. Thus, if electrical system voltage is low, output of the alternator may be increased via increasing torque applied to the engine via the alternator. In one example, the torque applied by the alternator to the engine can be increased via increasing field current supplied to the alternator. Further, the alternator torque applied to the engine can be a weighted function of the desired engine torque and a requested steering system input such as a steering angle or steering wheel torque. For example, if the steering angle input is low and the desired engine torque as input via a driver is high, only 10% of the torque that the alternator can apply to the engine may be applied to the engine via the alternator. In this way, the desired engine torque may be weighted higher than the steering input such that wheel torque is increased. On the other hand, if steering angle input is high and desired engine torque input via the driver is low, 100% of the torque that the alternator can apply to the engine may be applied to the engine via the alternator. In this way, the steering input may be weighted higher than the desired engine torque input such that increased engine torque is delivered to the alternator.

At 712, method 700 determines engine torque reserve. In one example, engine torque reserve may be determined based on present engine speed and load. Specifically, the maximum engine torque at the present engine speed may be determined via indexing a table or function based on the present engine speed. The table or function outputs the maximum empirically determined engine torque. The desired engine torque and the desired alternator torque are subtracted from the maximum engine torque to yield the engine torque reserve. Further, engine friction torque and engine pumping torque may be subtracted from the maximum engine torque. Method 700 proceeds to 714 after the engine torque reserve is determined.

At 714, method 700 judges whether or not the engine torque reserve is greater than zero. If so, method 700 proceeds to 732. Otherwise, method 700 proceeds to 716.

At 732, the engine throttle, cam timing, spark timing, and fuel amount can be adjusted to increase engine torque output. In particular, the throttle may be opened further and additional fuel may be provided to the engine to increase engine torque. Thus, when the engine has additional capacity to increase torque output, the engine output torque may be increased at least until the engine torque reserve is reduced near zero. Method 700 proceeds to 720 after engine output torque is increased.

At 716, method 700 adjusts alternator field current based on weighted steering system input and desired engine torque or desired vehicle wheel torque. FIG. 9 provides on example of how steering input and desired engine torque may be weighted to control the torque applied via the alternator to the engine. Of course, other weightings are possible. Thus, in one example, when the desired engine torque from an operator is at a higher level, more engine output torque at vehicle wheels may be provided and engine torque provided to provide electrical power to the steering system can be reduced. On the other hand, when steering system input is at a higher level, electrical system output may be increased via increasing the amount of torque applied to the engine via the alternator and wheel torque may be decreased. Method 700 proceeds to 718 after the alternator field current is adjusted based on weighted inputs of the steering system and the desired engine torque.

At 718, alternator field current may be further adjusted based on the present steering system angle requested by the driver, the steering wheel torque, and the rate of change of the steering wheel. In one example, alternator field current can be increased when the rate of change of the steering wheel is greater than a threshold level. Further, the alternator field current can be increased when the torque applied to the steering wheel is a higher level. On the other hand, if the steering wheel is at a maximum level of input torque or angle, the alternator field current may be held at a steady level. However, if the steering angle input is a low level and rapidly changed to angular input, alternator field current can be increased to improve steering response. Method 700 proceeds to 720 after alternator field current is adjusted.

It should also be mentioned that the load the alternator applies to the engine may be adjusted based on weighted inputs of desired engine torque and steering input until a threshold condition such as engine speed, vehicle speed, vehicle acceleration, or engine acceleration is reached. After the threshold condition is reached, the alternator field current may be adjusted in response to electrical load without being adjusted for desired engine torque.

At 720, method 700 judges whether or not wheel slip is detected. In one example, wheel slip can be detected when the speed of one wheel exceeds the speed of another wheel of the vehicle. If wheel slip is detected, method 700 proceeds to 722. Otherwise, method 700 proceeds to exit.

At 722, method 700 increases alternator field current when alternator field current is less than at full field current. By increasing alternator field current a greater portion of engine torque is provided to the alternator. As a result, wheel slip may be reduced and additional battery charge or power may be provided to the steering system. If the alternator field current is already at full field current, alternator field current may be held steady. Method 700 proceeds to exit after alternator field current is increased.

In this way, the alternator field may be controlled so as to reduce vehicle wheel slip and to weight desired engine torque against steering input so as to improve vehicle drivability. Further, the timing at which current is supplied to the alternator field coil can be adjusted so that the alternator load is applied to the engine at a time when the engine has the capacity to provide requested alternator torque.

Referring now to FIG. 9, an example weighting function for alternator load applied to an engine is shown. FIG. 9 shows a table having axis representing steering angle input or alternatively steering wheel torque and desired engine torque. The table outputs a percentage amount of the available torque that the alternator can apply to the engine. For example, in the upper left hand corner of the table, a table cell has a value of 0%. Therefore, when desired engine torque is near the output capacity of the engine, the alternator may be controlled to apply substantially no resistive torque to the engine. On the other hand, in the lower right hand corner of the table, where the desired engine torque is low and the steering angle input is high, the full capacity of the alternator to resist engine torque may be applied to the engine. The values in the table of FIG. 9 are merely for example and are not intended to limit the scope or breadth of the description.

Figure 10:
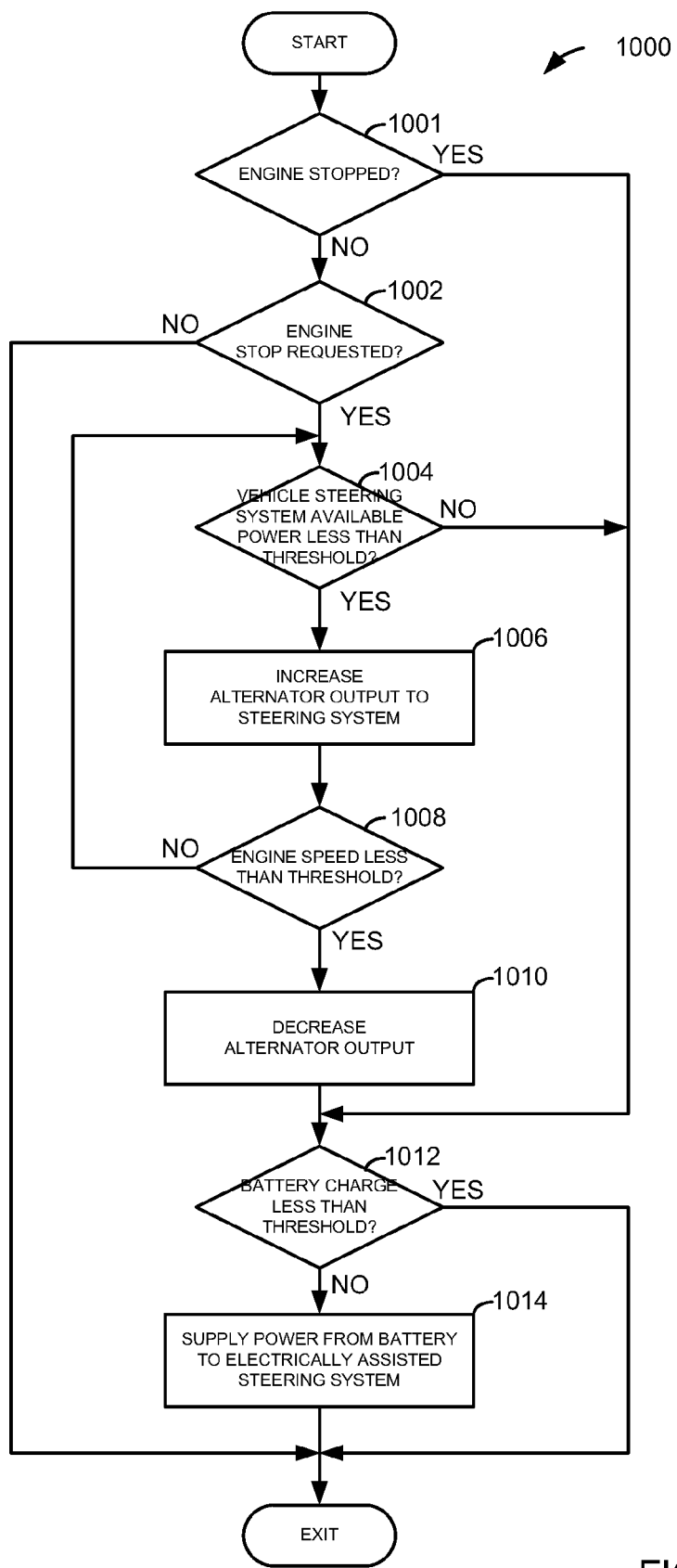
FIG. 10 is a flowchart of an automatic engine stop method.

Referring now to FIG. 10, a flowchart of a method for automatically stopping an engine is shown. The method of FIG. 10 may be performed via instructions of controller 12 of FIGS. 1 and 2.

At 1001, method 1000 judges whether or not the vehicle engine is stopped. In one example, it may be determined whether or not the engine is stopped based on output of an engine speed sensor. If the engine is stopped, method 1000 proceeds to 1012. Otherwise, method 1000 proceeds to 1002.

At 1002, method 1000 judges whether an engine stop has been requested. In one example, method 1000 judges whether or not the engine stop is an automatically requested engine stop. For example, method 1000 judges whether conditions other than a dedicated operator engine stop request (e.g., where the operator asserts an actuator such as a key switch that has a sole function of stopping an engine) are used to generate an engine stop. If an engine stop is requested, method 1000 proceeds to 1004. Otherwise, method 1000 proceeds to exit.

At 1004, method 1000 judges whether or not engine steering system available power is less than a threshold. In one example, method 1000 senses the amount of power stored in capacitors of an EPAS system. If the capacitors have less than a threshold amount of energy stored it may be judged desirable to increase the amount of energy stored in the capacitors as the engine is stopped. In one example, a level of charge stored in the EPAS system can be estimated by summing current entering and exiting the electrically assisted steering system. In this way, power may be stored in the EPAS system so that vehicle wheels may be turned before the engine begins to run after an engine stop. If method 1000 judges that engine power is less than a threshold level, method 1000 proceeds to 1006. Otherwise, method 1000 proceeds to exit without increasing an amount of electrical power supplied to the EPAS system.

At 1006, method 1000 increases power output from the alternator to the EPAS system. In one example, the amount of power supplied by the alternator to the EPAS system can be increased via increasing an amount of field current supplied to the alternator field. Thus, additional torque is applied to the engine via the alternator to generate additional electrical power to store in the EPAS system when the engine is off. Method 1000 proceeds to 1008 after alternator power output is increased.

At 1008, method 1000 judges whether or not engine speed is less than a threshold speed. If so, method 1000 proceeds to 1010. Otherwise, method 1000 returns to 1004.

At 1010, method 1000 decreases alternator output. In one example, alternator output can be decreased via decreasing alternator field current. Method 1000 can decrease alternator field current so that current is not used to create an alternator field when doing so will not increase or provide alternator output. For example, it may be determined that the alternator output is less than is desired below a threshold engine speed. Consequently, it may be desirable to stop field current when engine speed is less than the threshold engine speed. Method 1000 proceeds to 1012 after alternator output is decreased.

At 1012, method 1000 judges whether or not battery charge is less than a threshold level. If so, method 1000 proceeds to exit. Otherwise, method 1000 proceeds to 1014.

At 1014, method 1000 supplies charge from the battery to the electrically assisted power steering system as needed to maintain a threshold amount of energy within the electrically assisted power steering system. In one example, a voltage of the electrically assisted power steering system may be periodically sampled while the engine is off to determine whether or not additional charge is to be supplied from the vehicle battery to the electrically assisted power steering system. If the amount of energy stored within the electrically assisted power steering system falls to a level below a threshold level of energy, the battery can be coupled to the electrically assisted power steering system to supply additional energy to the electrically assisted power steering system. When the energy stored in the electrically assisted power steering system reaches the threshold level, the battery can be decoupled from the electrically assisted power steering system. Thus, the battery does not have to continuously supply power to the electrically assisted power steering system in some examples.

Thus, the methods of FIGS. 7-8 and 10 provide for a vehicle launch control method, comprising: adjusting a load of an alternator applied to an engine in response to a steering input and an engine torque request. In this way, engine torque can be allocated to higher priority engine torque consumers. The method includes where the load of the alternator is adjusted in response to weightings of the steering input and the engine torque request. The method also includes where load of the alternator is adjusted during an engine start until a threshold vehicle condition is exceeded. The method includes where the threshold vehicle condition is at least one of a vehicle speed, engine speed, vehicle acceleration rate, and engine acceleration rate. In one example, the method includes where the load of the alternator is adjusted via adjusting a field current of the alternator. The method also includes where the load of the alternator applied to the engine during engine cranking is limited via supplying substantially zero current to the alternator. The further comprises decreasing a torque supplied to vehicle wheels in response to an increased steering angle request. In this way, the forward progress wheel torque generation can be decreased to provide additional electrical power to turn the vehicle wheels. The method further comprises increasing the load of the alternator applied to the engine in response to an increased steering angle request.

In another example, the methods of FIGS. 7-8 and 10 provide for a vehicle launch control method, comprising: in a first mode where an operator input is less than a threshold, adjusting an alternator load applied to an engine to control engine speed and limit a voltage drop caused by an electric power steering system; in a second mode where the operator input is greater than the threshold, adjusting the alternator load applied to the engine responsive to the operator accelerator input and a steering input. The method includes where the operator input is an accelerator command. The method also includes where the first and second mode are entered after engine cranking and before a threshold vehicle condition is met. A method further includes where the threshold vehicle condition is one of a vehicle speed, vehicle acceleration, engine speed, and engine acceleration. The method includes where during engine cranking current supplied to an electric steering system is limited. The method also includes where alternator loading of the engine is allowed to commence in response to a combustion event.

The methods of FIGS. 7-8 and 10 also provide for a vehicle launch control method, comprising: automatically restarting an engine of the vehicle from a stopped vehicle condition; during higher steering operation conditions, diverting a greater amount of engine output away from forward progress wheel torque generation and to a power steering system; and during lower steering operation conditions, diverting a lesser amount of engine output away from forward progress wheel torque generation and to the power steering system. The method includes where higher steering operating conditions include steering torque request greater than a threshold, steering torque output greater than a threshold, steering angle greater than a threshold. The method also includes where the diverting occurs during an engine start before engine speed reaches a threshold and before engine torque reaches a threshold. The method also includes where the diverting begins during an engine start after a starter is disengaged.

The methods of FIGS. 7-8 and 10 also provide for a method for supplying power to an electrically assisted steering system, comprising: adjusting a load of an alternator applied to an engine in response to an engine stop request and increasing energy supplied to an electrically assisted steering system. The method includes where the engine stop request is an automatic engine stop request absent a dedicated operator engine stop request. The method also includes where load of the alternator is adjusted during an engine stop via adjusting field current supplied to the alternator. In one example, the method includes where the field current supplied to the alternator is adjusted in response to a level of energy stored in the electrically assisted steering system. In still another example, the method includes where the field current is adjusted to a first level of current in response to a first level of energy stored in the electrically assisted steering system and where the field current is adjusted to a second level of current in response to a second level of energy stored in the electrically assisted steering system, the second level of current lower than the first level of current, the second level of energy higher than the first level of energy. The method also includes where a level of energy stored in the electrically assisted steering system is determined via summing current entering and exiting the electrically assisted steering system. The method also includes where the load of the alternator applied to an engine is increased in response to the engine stop request before fuel flow supplied to the engine is decreased in response to the engine stop request. The method further comprises automatically starting the engine absent a dedicated operator engine start request.

The methods of FIGS. 7-8 and 10 also provide for a method for supplying power to an electrically assisted steering system, comprising: increasing an amount of energy stored in an electrically assisted steering system in response to an engine stop request and an amount of energy stored in the electrically assisted steering system. The method also includes where the amount of energy stored in the electrically assisted steering system is further adjusted in response to an engine speed. The method also includes where the amount of energy stored in the electrically assisted steering system is increased via increasing a field current supplied to an alternator. In another example the method of claim 11, includes where flow of the field current is stopped when engine speed is less than a threshold speed. The method further comprises increasing the amount of energy stored in the electrically assisted steering system after an engine stop. In this way, the electrical assisted steering system can be ready to assist the driver to turn vehicle wheels even if the engine has been stopped for an extended period of time. The method includes where the amount of energy stored in the electrically assisted steering system is increased via current supplied from a battery of a vehicle. The method also includes where current supplied to the electrically assisted steering system from the battery is interrupted in response to an engine start request.

As will be appreciated by one of ordinary skill in the art, routines described in FIGS. 7-8 and 10 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for supplying power to an electrically assisted steering system, comprising:
adjusting a load of an alternator applied to an engine in response to an engine stop request and increasing energy supplied to an electrically assisted steering system,
where the load of the alternator applied to the engine is increased in response to the engine stop request before fuel flow supplied to the engine is decreased in response to the engine stop request.

2. The method of claim 1, where the engine stop request is an automatic engine stop request absent a dedicated operator engine stop request.

3. The method of claim 1, where the load of the alternator is adjusted during an engine stop via adjusting a field current supplied to the alternator.

4. The method of claim 3, where the field current supplied to the alternator is adjusted in response to a level of energy stored in the electrically assisted steering system.

5. The method of claim 4, where the field current is adjusted to a first level of current in response to a first level of energy stored in the electrically assisted steering system and where the field current is adjusted to a second level of current in response to a second level of energy stored in the electrically assisted steering system, the second level of current lower than the first level of current, the second level of energy higher than the first level of energy.

6. The method of claim 4, where a level of energy stored in the electrically assisted steering system is determined via summing current entering and exiting the electrically assisted steering system.

7. The method of claim 1, further comprising automatically starting the engine absent a dedicated operator engine start request.

8. A method for supplying power to an electrically assisted steering system, comprising:
increasing an amount of energy stored in an electrically assisted steering system in response to an engine stop request and an amount of energy stored in the electrically assisted steering system; and
increasing a load of an alternator applied to an engine in response to the engine stop request before fuel flow supplied to the engine is decreased in response to the engine stop request.

9. The method of claim 8, where the amount of energy stored in the electrically assisted steering system is further adjusted in response to an engine speed.

10. The method of claim 8, where the amount of energy stored in the electrically assisted steering system is increased via increasing a field current supplied to the alternator.

11. The method of claim 10, where flow of the field current is stopped when engine speed is less than a threshold speed.

12. The method of claim 8, further comprising increasing the amount of energy stored in the electrically assisted steering system after an engine stop.

13. The method of claim 12, where the amount of energy stored in the electrically assisted steering system is increased via current supplied from a battery of a vehicle.

14. The method of claim 13, where current supplied to the electrically assisted steering system from the battery is interrupted in response to an engine start request.

15. A system for controlling energy of an electrically assisted steering system, comprising:
an electrically assisted steering system;
a battery;
an engine; and
a controller, the controller including instructions to:
increase a load of an alternator applied to the engine in response to an automatic engine stop request in the engine in absence of a dedicated operator engine stop request and before fuel flow supplied to the engine is decreased in response to the automatic engine stop request;
increase an amount of energy stored in the electrically assisted steering system in response to the automatic engine stop request; and
supply energy from the battery to the electrically assisted steering system when the engine is stopped.

16. The system of claim 15, where the amount of energy stored in the electrically assisted steering system is increased via adjusting field current of the alternator.

17. The system of claim 15, further comprising additional controller instructions to limit current flow from the battery to the electrically assisted steering system in response to a charge level of the battery.

18. The system of claim 15, further comprising additional controller instructions to increase energy stored in the electrically assisted steering system via adjusting a field current supplied to the alternator.

19. The system of claim 18, further comprising additional controller instructions to limit the field current supplied to the alternator in response to engine speed.

* * * * *